(No Model.)
F. H. BEAVER.
POTATO PLANTER.
No. 550,434. Patented Nov. 26, 1895.
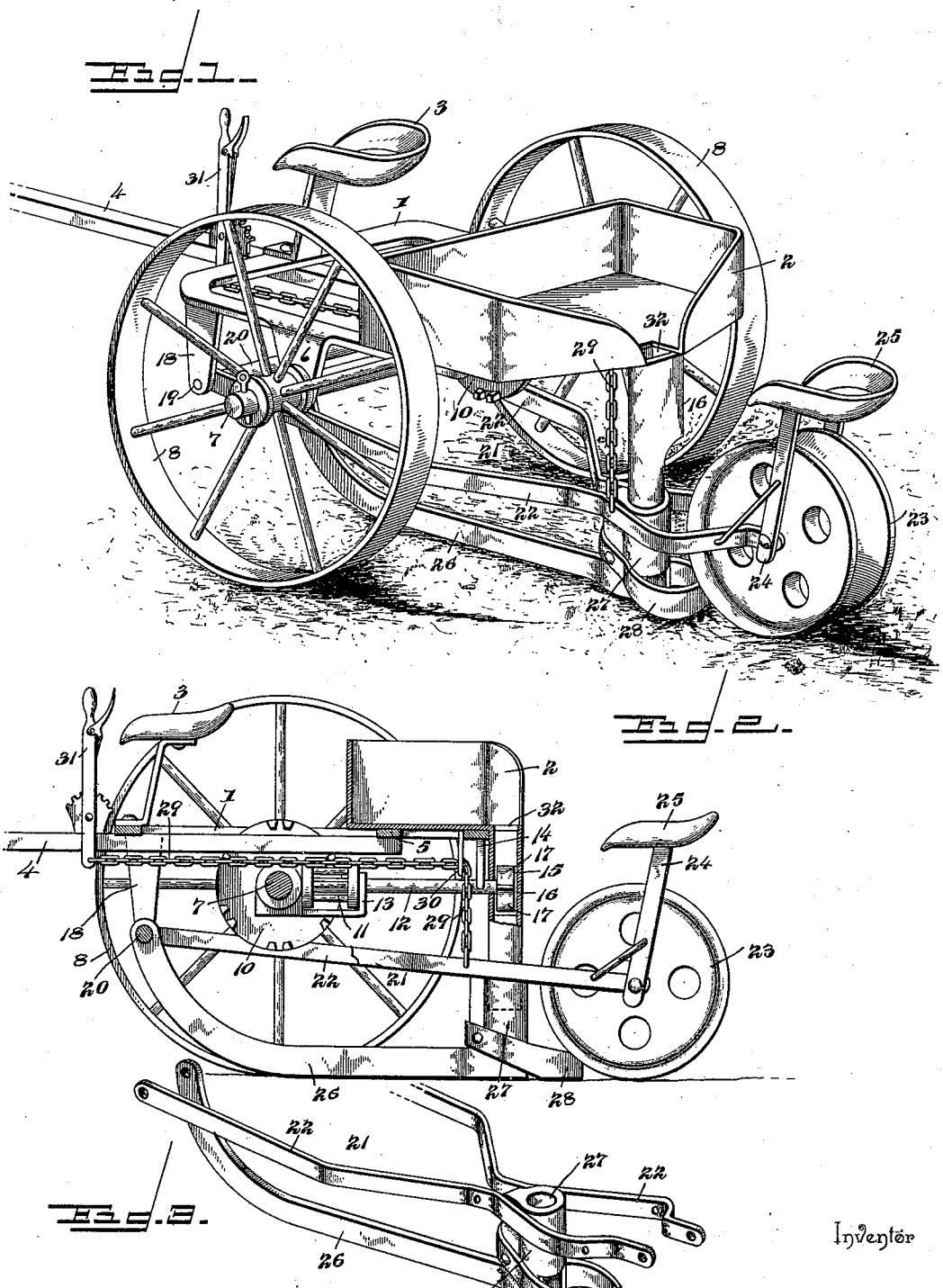
Witnesses
E. H. Stewart
Inventor
By his Attorneys, Frank H. Beaver
C. A. Snow & Co.

UNITED STATES PATENT OFFICE.

FRANK H. BEAVER, OF SUN PRAIRIE, WISCONSIN.

POTATO-PLANTER.

SPECIFICATION forming part of Letters Patent No. 550,434, dated November 26, 1895.

Application filed December 29, 1894. Serial No. 533,344. (No model.)

*To all whom it may concern:*

Be it known that I, FRANK H. BEAVER, a citizen of the United States, residing at Sun Prairie, in the county of Dane and State of Wisconsin, have invented a new and useful Potato-Planter, of which the following is a specification.

My invention relates to a device for planting potatoes; and the object in view is to provide a simple and efficient apparatus designed for planting in hills at the desired intervals and with accuracy at the desired depth, the means whereby the depth of the planting is regulated being adjustable.

Further objects and advantages of the invention will appear in the following description, the novel features thereof being particularly pointed out in the appended claims.

In the drawings, Figure 1 is a perspective view of a potato-planting machine constructed in accordance with my invention. Fig. 2 is a longitudinal central section of the same. Fig. 3 is a detail view of the furrow-opening shoe.

Similar numerals of reference indicate corresponding parts in all the figures of the drawings.

1 designates a frame, upon which are arranged a receptacle or hopper 2 and in front thereof a seat 3, a tongue 4 being attached to the frame and extending rearwardly to a cross bar 5 beneath the receptacle or hopper. Mounted in bearings 6, which depend from the side bars of the frame, is a shaft 7, to which are fixed the ground-wheels 8, and secured to an intermediate part of said shaft is a mutilated gear 10, having a plurality of sets of teeth disposed to engage a pinion 11, carried by a counter-shaft 12. This counter-shaft is mounted at its front end in a bracket 13, supported by the main shaft, and at its rear end in a bearing formed in a depending ear 14, forming a part of the frame of the machine, and fixed to this counter-shaft is a feed-wheel 15, arranged in a chute 16, which communicates with the receptacle or hopper at its rear side, said feed-wheel consisting of a series of radially-disposed wings 17, which feed the desired number of potatoes or parts thereof at a time.

Depending from the frame near its front end are the hangers 18, in bearings 19 of which are mounted the reduced terminals of a transverse spindle 20, forming a part of a pivotal frame 21, said frame consisting of bowed side bars 22, which are connected at a point slightly in advance of the chute and in rear thereof are separated to support the spindle of a peripherally-concaved roller 23. Rising from the rear extremity of the side bars of said pivotal frame are the standards 24, preferably constructed of a single looped bar and adapted to support a seat 25, whereby the desired pressure of the roller upon the surface of the ground may be produced. Attached at its front end to the spindle of the pivotal frame is a furrow-opening shoe 26, adjacent to the rear end of which is located a sleeve or chute extension 27, adapted to receive the lower end of the chute proper and form an extension thereof, whereby the pivotal frame may be adjusted to cause the desired penetration of the furrow-opening shoe without allowing the seed-potatoes to scatter. In rear of the chute extension are the oppositely-disposed furrow-closing shovels 28, which draw the earth inwardly in advance of the roller to cover the potatoes. Attached to the rear end of the pivotal frame, adjacent to the chute, is a chain 29, which, after extending upward and through a guide-eye 30, extends to the front of the main frame and is connected to a hand-lever 31, by which the pivotal frame may be elevated at its rear end. Suitable locking devices are arranged in operative relation with the hand-lever to hold it at the desired adjustment.

The rear side of the receptacle or hopper is cut away at its center to form an opening 32, whereby the assistant, who rides upon the seat supported by the roller, may control the supply of potatoes to the chute to prevent crowding.

The operation of the apparatus will be readily understood from the foregoing description, and it will be understood that the pinion carried by the counter-shaft may have any desired number of teeth and that the mutilated gear is interchangeable to provide for its replacement by a gear having a different number of sets of teeth to vary the intervals between the hills.

Having described my invention, I claim—

1. In a potato planting machine, the combination of a frame and ground-wheels, a receptacle or hopper mounted upon the frame, a chute communicating with said receptacle or hopper, a feed-wheel located within and below the inlet end of the chute, means for communicating intermittent motion from the ground-wheels to the feed-wheel, a furrow-opening shoe pivotally connected to the frame, a chute-extension carried by said furrow opening shoe and fitting to telescope upon the lower end of the chute, whereby adjustment of the shoe is possible without breaking the connection between the chute and the chute-extension, furrow-closing shovels, and a peripherally concaved roller arranged in rear of the furrow-closing shovels, substantially as specified.

2. The combination of a frame and ground-wheels, a receptacle or hopper provided in its rear side with a central opening, a chute communicating with the receptacle or hopper at a point contiguous to said opening in the rear side thereof, a pivotal furrow-opening shoe, a tubular chute extension attached to the furrow-opening shoe and fitting to slide vertically upon the lower end of the chute, furrow-closing shovels, a peripherally concaved roller, and a seat supported by said roller, substantially as specified.

3. The combination of a main frame provided with depending bearings, a shaft mounted in said bearings, ground-wheels secured to the shaft, a fixed receptacle or hopper supported by said frame, a chute communicating with the receptacle or hopper, hangers depending from the frame at its front end, a pivotal frame having a front spindle provided with reduced terminals mounted in bearings in said hangers, a furrow-opening shoe attached at its front end to said spindle, a tubular chute-extension carried by the furrow-opening shoe, furrow-closing shovels, a roller arranged in rear of the furrow-closing shovels and carried by the pivotal frame, means for elevating the rear end of the pivotal frame to vary the depth of penetration of the furrow-opening shoe, a winged feed-wheel located in the portion of the chute carried by the main frame, a pinion carried by the shaft of the feed-wheel, and a mutilated gear having a continuous rotary motion arranged to mesh at intervals with the pinion, substantially as specified.

In testimony that I claim the foregoing as my own I have hereto affixed my signature in the presence of two witnesses.

FRANK H. BEAVER.

Witnesses:
D. DAVIS,
C. A. LEWIS.